C. L. Barritt,
Cup
No. 40,017.　　　　Patented Sept. 22, 1863.
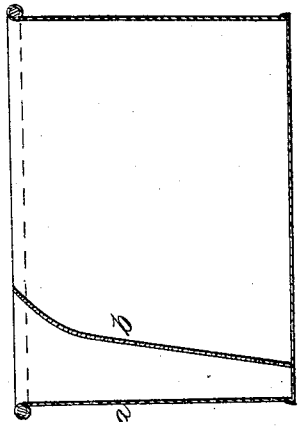
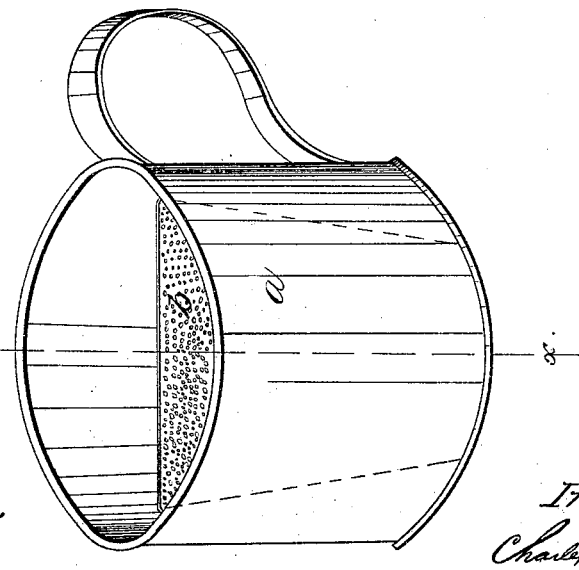
Witnesses:
R. Rowley
G. Harper
Inventor:
Charles L. Barritt

UNITED STATES PATENT OFFICE.

CHARLES L. BARRITT, OF NEW YORK, N. Y.

IMPROVED COFFEE AND WATER CUP FOR SOLDIERS.

Specification forming part of Letters Patent No. 40,017, dated September 23, 1863.

*To all whom it may concern:*

Be it known that I, CHARLES L. BARRITT, of the city, county, and State of New York, have invented and produced a certain new and useful article of manufacture, which I have designated as the "Soldier's Water and Coffee Filtering Drinking-Cup;" and I do hereby declare the following to be a full description of the same.

The object of my invention is to supply the soldier with a simple and expeditious and at the same time a cheap mode of filtering or straining his coffee, tea, and other drinks hastily prepared while on duty, or obtained from way-side brooks when on marches; and the nature of my invention consists in combining with the cup a filterer composed of perforated tin, or its equivalent, in such a manner as to subdivide the cup vertically, or nearly so, into two compartments of unequal areas, so that when the liquid is taken out the larger compartment it percolates through the strainer or filterer into the smaller one, and thus permits the soldier to drink off the contents of his cup in a pure and healthful condition, and especially free from the dreadful apprehension of swallowing lizards, spawn of frogs, bugs, &c., when taking drinks from shallow streams of water in the night-time.

But, to describe my invention more particularly, I will refer to the accompanying drawings, forming a part of this specification, the same letters of reference, wherever they occur, referring to like parts.

Figure 1 is a perspective view of the cup and filterer. Fig. 2 is a vertical cut sectional view of the same parts.

Letter A is the cup, which may be made of any metal or material suitable for the purpose required. In this cup is secured, by soldering or any other suitable means, a filterer or strainer, *b*. This, for the purposes intended, is made of perforated tin-plate; but wire-gauze or other porous substances may be used, if deemed advisable, with the same good effects, and I therefore do not limit myself to the use of perforated tin-plate, should other perforated or porous substances be found to be desirable in use.

The precise arrangement of the filterer or strainer exhibited in the drawings accompanying this specification is not material, though for practical purposes I believe the cup should be divided vertically, or nearly so, into two compartments of unequal areas, the larger one extending over, or nearly so, the bottom of the cup, so as to allow the coffee or other sedimentary matter to precipitate rapidly, and the smaller one to have a flaring top, so as to permit the edge of the cup to be taken easily between the lips to drink off its contents.

Having now described my invention, I will proceed to set forth what I claim and desire to secure by Letters Patent of the United States:

As a new article of manufacture, the use of a cup having a filterer or strainer in it in form and principle of operation substantially as hereinbefore set forth.

CHARLES L. BARRITT.

Witnesses:
 R. ROWLEY,
 G. HARPER.